(12) United States Patent
Nagano et al.

(10) Patent No.: US 7,606,126 B2
(45) Date of Patent: Oct. 20, 2009

(54) INFORMATION RECORDING METHOD AND INFORMATION RECORDING MEDIUM

(75) Inventors: Hideki Nagano, Tsukuba (JP); Hironori Ota, Moriya (JP); Hideyuki Kubo, Tokyo (JP); Takeshi Kuriwada, Tokyo (JP); Yutaka Kurose, Tokyo (JP)

(73) Assignees: Mitsubishi Kagaku Media Co., Ltd., Tokyo (JP); Hitachi Maxell, Ltd., Osaka (JP)

(*) Notice: Subject to any disclaimer, the term of this patent is extended or adjusted under 35 U.S.C. 154(b) by 583 days.

(21) Appl. No.: 10/941,850

(22) Filed: Sep. 16, 2004

(65) Prior Publication Data

US 2005/0063274 A1 Mar. 24, 2005

(30) Foreign Application Priority Data

Sep. 18, 2003 (JP) ............................. 2003-326552

(51) Int. Cl.
G11B 7/12 (2006.01)
G11B 20/10 (2006.01)
(52) U.S. Cl. ................................. 369/47.53; 369/59.11
(58) Field of Classification Search ........................ None
See application file for complete search history.

(56) References Cited

U.S. PATENT DOCUMENTS 5,400,313 A * 3/1995 Belser et al. ............. 369/59.11
6,236,635 B1 * 5/2001 Miyamoto et al. .......... 369/116
6,338,888 B1 1/2002 Takase et al.
6,459,670 B1 * 10/2002 Kuwahara et al. ........ 369/59.12
7,088,667 B2 8/2006 Kobayashi
7,317,678 B2 1/2008 Kobayashi
2001/0043540 A1 * 11/2001 Tieke et al. ............... 369/59.11
2002/0186633 A1 * 12/2002 Kai et al. .................. 369/47.51
2003/0021201 A1 1/2003 Kobayashi
2003/0123352 A1 * 7/2003 Chen ....................... 369/47.53
2003/0151994 A1 * 8/2003 Tasaka et al. ............. 369/47.53
2005/0105454 A1 * 5/2005 Martens .................... 369/275.1
2006/0227698 A1 10/2006 Kobayashi

FOREIGN PATENT DOCUMENTS

| CN | 1255227 A | 5/2000 |
| JP | A-08-124163 | 5/1996 |
| JP | A-10-214423 | 8/1998 |
| JP | 11-102522 | * 4/1999 |
| JP | A-2001-176072 | 6/2001 |
| JP | A-2003-045036 | 2/2003 |

* cited by examiner

*Primary Examiner*—Joseph H Feild
*Assistant Examiner*—Christopher R. Lamb
(74) *Attorney, Agent, or Firm*—Oliff & Berridge, PLC (57) ABSTRACT

An information recording method allows optical information having a recording mark length smaller than a spot diameter of laser light to be recorded on an optical recording medium having a recording layer, at high density by laser light pulse application. The information recording method has: a power calibration step of determining a recording power for recording a signal having a predetermined signal length in the recording layer using the laser light; and a complementing step of complementing, based on the recording power determined in the power calibration step, a recording power for recording a signal having a signal length equal to or less than ½ of the spot diameter of the laser light in the recording layer using the laser light. In the information recording method, for example, an extremely small mark, such as a 2T signal, can be precisely formed.

8 Claims, 5 Drawing Sheets

FIG.3A recording power (mW)

FIG.3B recording power (mW)

FIG. 4

INFORMATION RECORDING METHOD AND INFORMATION RECORDING MEDIUM

BACKGROUND OF THE INVENTION

1. Field of the Invention

The present invention relates to an information recording method for optical information. More specifically, the present invention relates to a high-density information recording method and a high-density information recording medium for optical information.

2. Description of the Related Arts

In recent years, not only information for computers but also information of voices, still images, moving images, and the like are digitized, and an amount of information dealt with has become extremely large. Along with this, a necessity for further increasing capacities of optical recording media for storing such information also arises. Such optical recording media include read-only information recording media, write-once information recording media in which additional recording is allowed, and rewritable information recording media in which information can be rewritten. Rewritable information recording media include magneto-optical recording media, phase change-type optical recording media, and the like. Write-once information recording media include, for example, organic dye-based optical recording media containing an organic dye in recording layers. In particular, among organic dye-based optical recording media, CD-Rs in which recording and reproduction are performed using laser light having a wavelength of approximately 780 nm are in widespread use all over the world. Further, recently, there is a sign that DVD-Rs and DVD+Rs, in which recording and reproduction are performed using laser light having a wavelength of approximately 650 nm, become widespread following CD-Rs.

A method of recording information on such a write-once optical recording medium is performed as follows: intense laser light is applied to a recording layer containing an organic dye to change optical characteristics and shapes of the organic dye, a substrate material around the organic dye, a metal reflecting film, and the like, thus generating a difference in reflectivity between an unrecorded state and a recorded state. So far, a large number of methods for optimizing strategy (waveform rule for pulse emission) have been proposed in order to obtain favorable recording qualities. As partially described in specifications of DVD-Rs and the like, a method of, in order to record information at high density, controlling timing of an edge of a recording mark by splitting incident laser light for optical recording into multiple pulses in mark length modulation recording (method in which recording is performed by modulation of mark and space signals) has been established and is in practical use for DVD-Rs and DVD+Rs (e.g. refer to Patent Document 1).

(Patent Document 1) Japanese Unexamined Patent Publication No. 2001-176072 (paragraph 0017 and the like)

Heretofore, as a method for dramatically increasing the capacity of an optical recording medium, a technology and the like for shortening a wavelength ($\lambda$) of laser light and increasing a numerical aperture (NA) of an objective lens to reduce a laser spot diameter (laser wavelength/NA) for recording and reproduction, have been performed. By such a technology, DVD-RAMs and DVD-RWs having capacities seven times those of conventional CD-Rs have been commercialized. The amount of information has a tendency to continue to increase. Accordingly, as the demand for larger capacities of optical recording media, for example, a medium having a capacity of 15 GB or more and the size of a CD, i.e. 12 cm, is earnestly being desired in order to record high-quality video information of two hours or more. In order to obtain a medium having such a large capacity, an oscillation wavelength of laser light for recording and reproduction is being further reduced. That is, instead of semiconductor laser light which has a wavelength of 640 nm to 680 nm and which is used for present DVDs, development of an optical recording medium which allows recording and reproduction using laser light having a wavelength of 405 nm is being advanced.

Furthermore, as a next-generation DVD technology, 1-7 modulation system in which data of one bit is replaced with a data sequence of seven bits to be recorded, has been proposed. That is, in the next-generation DVD technology, instead of EFM (8 to 14 modulation) used in the CD standard heretofore and 8-16 modulation system in which data of eight bits is replaced with a data sequence of 16 bits to be recorded, 1-7 modulation system is adopted in order to further improve an efficiency of recording an enormous amount of information and to respond to the demand for larger capacities of optical recording media.

Incidentally, in the case of this 1-7 modulation system, since a mark length of a 2T signal, which is a shortest mark, is approximately ⅓ of a laser spot diameter, a signal amplitude by recording and reproducing light applied to an optical recording medium is hardly ensured. Accordingly, information of the recorded 2T signal is read using a fluctuation in signal level, i.e. asymmetry.

Moreover, in the case of 1-7 modulation system, in order to perform high-density recording, for example, the mark length of a 2T signal, which is a shortest mark, is approximately ⅓ of the laser spot diameter, and the mark length of a 3T mark, which is the second smallest signal, is approximately ½ of the laser spot diameter. Accordingly, recorded information is read using the fluctuation in signal level, i.e. asymmetry, in the case of the 2T signal for which a signal amplitude cannot be ensured, whereas recorded information is read using a signal amplitude in the case of the 3T or longer signal. Thus, recording at higher density than heretofore can be performed.

In particular, in a case of a write-once optical recording medium provided with a recording layer containing organic dyes, short recording marks are generally tend to be hard to form compared to a case of a recording layer containing phase-change materials. Accordingly, in a case where an extremely small recording mark, such as the 2T signal, is formed as described above, the asymmetry does not become approximately zero, thus causing a problem that a read error of recorded information occurs.

SUMMARY OF THE INVENTION

The present invention is to solve the above-described technical problems.

Specifically, an object of the present invention is to provide a high density information recording method in which recording marks having signal lengths smaller than the spot diameter of laser light are recorded on an optical recording medium.

Further, another object of the present invention is to provide a high density information recording medium suitable for recording of recording marks having signal lengths smaller than the spot diameter of laser light.

With the above-described objects, the present invention provides a method of recording information on an information recording medium having a recording layer. Here, the method includes: a power calibration step of determining a recording power for recording a signal having a predetermined signal length in the recording layer using laser light;

and a complementing step of complementing, based on the recording power determined in the power calibration step, a recording power for recording a signal having a signal length equal to or less than ½ of a spot diameter of the laser light in the recording layer using the laser light.

The complementing step in the information recording method to which the present invention is applied preferably has a process of previously recording a signal having a signal length equal to or less than ½ of the spot diameter of the laser light in a test writing area provided in the recording layer and of repeating calibration operation to set an asymmetry of an RF signal reproduced from a recorded recording mark to approximately zero. That is, by performing such a process, calibration for recording a signal having a signal length equal to or less than ½ of the spot diameter of the laser light is performed a plurality of times in addition to calibration for recording a signal having a signal length larger than ½ of the spot diameter of the laser light.

Moreover, the complementing step in the information recording method to which the present invention is applied preferably has a process of complementing, for each recording speed when a signal is recorded on the information recording medium, the recording power for recording the signal having a signal length equal to or less than ½ of the spot diameter of the laser light. That is, application conditions of the laser light are different depending on each recording speed.

On the other hand, it can be considered that, for example, a ratio between a recording power for a 2T signal and that for a 3T signal (T is one channel clock) is previously found by performing the calibration of recording power for signals having predetermined signal lengths at a plurality of recording speeds. In this case, in the complementing step, it is possible to calculate a recording power at a predetermined recording speed based on a recording power at which a signal having a signal length equal to or less than ½ of the spot diameter of the laser light has been recorded at a reference recording speed.

The complementing step in the information recording method to which the present invention is applied can solve the problem that recording with a predetermined asymmetry cannot be performed using only the length of a pulse when an extremely small mark, such as a 2T signal, is formed, and can provide an information recording method in which even a shortest mark can be precisely formed, if the complementing step is applied to the case where a recording power for recording, in the recording layer, using the laser light, a signal in which a signal length of information is equal to or less than ⅓ of the spot diameter of the laser light is complemented.

Further, the laser light used in the information recording method to which the present invention is applied preferably provides pulse application in which pulses are intermittently applied to the recording layer of the information recording medium at predetermined intervals.

Moreover, the laser light forms a recording mark having a length of nT (n is an integer equal to or larger than 2, and T is one channel clock) by applying (n−1) or (n−2) (one when n is two) recording pulses to the recording layer. Such pulse application is particularly effective in high-density recording in which, for example, a mark having a size equal to or less than ½ of a laser spot diameter is formed and which is considered as one of next-generation DVD technologies.

Furthermore, the recording layer which the information recording medium has preferably contains organic dyes. That is, the information recording method to which the present invention is applied allows an extremely small recording mark, such as a 2T signal, to be efficiently formed in a write-once optical recording medium having an organic dye layer, in which a short recording mark is more difficult to form compared in a case of a recording layer containing a phase-change material.

On the other hand, the present invention provides an information recording medium including: a substrate; a recording layer which is provided on the substrate and on which information is recorded by application of laser light; and a predetermined area in which data concerning a recording power for recording a signal having a signal length equal to or less than ½ of a spot diameter of the laser light in the recording layer using the laser light is recorded.

As means for shortening a time required for calibration, the following is effective: for example, information concerning the complementing of a recording power for a recording mark having a signal length for which the information can be predicted to a certain degree from physical properties of the organic dye constituting the recording layer, the shapes of guide grooves formed in the substrate, and the like, is previously recorded in such a predetermined area before a user uses the information recording medium.

In the above-described predetermined area, data concerning an optimum recording power for recording a signal having a signal length equal to or less than ½ of the spot diameter of the laser light is preferably recorded.

Further, in the above-described predetermined area, data for recording the signal having a signal length equal to or less than ½ of the spot diameter of the laser light is preferably recorded for each recording speed when information is recorded using the laser light. That is, since recording powers of the laser light are different depending on recording speeds (linear velocities), the following is an effective method as means for shortening the time required for calibration: data for recording a signal having a signal length equal to or less than ½ of the spot diameter of the laser light is previously recorded for each recording speed (linear velocity) before a user uses the information recording medium.

Moreover, in the predetermined area, the data for recording the signal having a signal length equal to or less than ½ of the spot diameter of the laser light at a reference recording speed using the laser light is preferably recorded. For example, data concerning the complementing of a recording power for recording a signal having a signal length equal to or less than ½ of the spot diameter of the laser light can be calculated for each different recording speed (linear velocity) by using a ratio between the recording speed (linear velocity) and a reference speed.

On the other hand, the predetermined area of the information recording medium to which the present invention is applied is preferably formed in the recording layer.

In addition, when the information recording medium is manufactured, the above-described predetermined area is preferably formed in the substrate in a cutting step of a stamper, and the data for recording the signal having a signal length equal to or less than ½ of the spot diameter of the laser light is preferably embedded in the predetermined area.

Furthermore, the present invention provides a method of determining a recording power for recording information on an information recording medium having a recording layer. Here, the method includes: a power calibration step of determining a recording power for recording a signal having a predetermined signal length in the recording layer using laser light; and a complementing step of complementing, based on the recording power determined in the power calibration step, a recording power for recording a signal having a signal length equal to or less than ½ of a spot diameter of the laser light in the recording layer using the laser light.

With the present invention, a method of recording optical information in which optical information having a recording mark length smaller than a laser spot diameter is recorded in an optical recording medium at high density can be obtained.

BRIEF DESCRIPTION OF THE DRAWINGS

FIGS. 3A and 3B are graphs for explaining a result of calibration of recording power (Pw) of laser light for predetermined signal lengths of recording marks.

DESCRIPTION OF THE PREFERRED EMBODIMENT

Hereinafter, a best mode (hereinafter referred to as an embodiment) for carrying out the present invention will be described with reference to the accompanying drawings.

Figure 1:
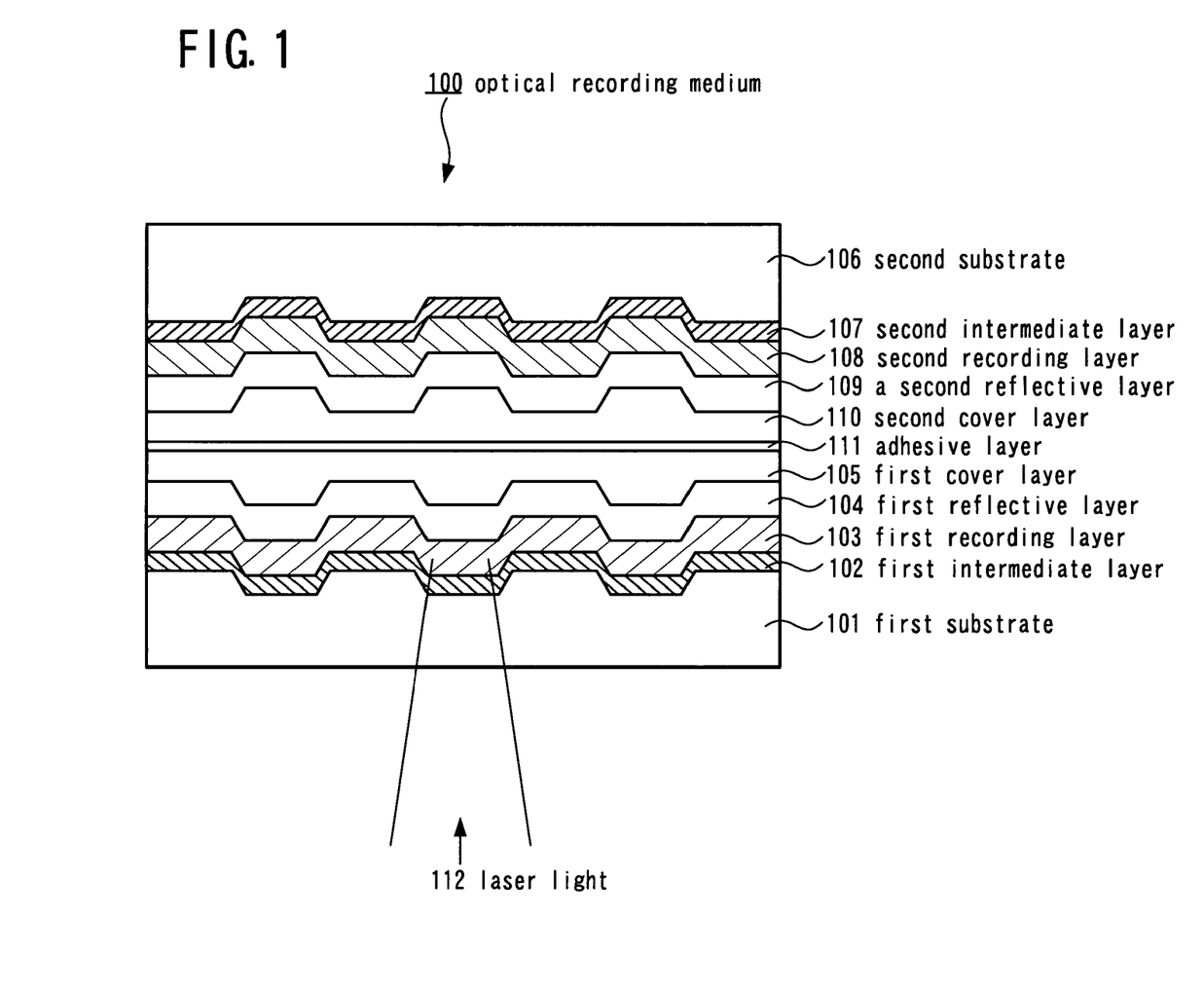
FIG. 1 is a view for explaining an information recording medium for recording information by an information recording method to which an embodiment of the present invention is applied.

FIG. 1 is a view for explaining an information recording medium for recording information by an information recording method to which the present embodiment is applied. FIG. 1 shows, as the information recording medium, a write-once optical recording medium 100 provided with recording layers containing an organic dye. The optical recording medium 100 has the following structure: a first substrate 101, which is made of a polycarbonate resin and has a first intermediate layer 102, a first recording layer 103, a first reflective layer 104, and a first cover layer 105 formed in this order on the first substrate 101, and another substrate, which has the same constitution, i.e. which has a second substrate 106, a second intermediate layer 107, a second recording layer 108, a second reflective layer 109, and a second cover layer 110, are adhered to each other in such a manner that the first and second cover layers 105 and 110 face each other with an adhesive layer 111 interposed therebetween.

Each of the first and second substrates 101 and 106 is manufactured by injection molding. For example, in each thereof, a groove having a groove width (WG) of 200 nm, a land width (WL) of 225 nm, and a track pitch (W) of 0.425 μm is formed in a surface of a polycarbonate resin plate having a diameter of 120 mm and a thickness of 0.6 mm. In the first and second substrates 101 and 106, disk identification information, address information, and the like are recorded using wobbles of the grooves. Such disk identification information, address information, and the like can also be formed by pre-marking. It is noted that grooves are used as tracks for information recording. The first and second intermediate layers 102 and 107 are each formed to have a thickness of 20 nm using ZnS—$SiO_2$ as a target in argon gas. It is noted that $SiO_2$ can also be used for the first or second intermediate layer 102 or 107.

The first and second recording layers 103 and 108 are each formed, for example, as follows: among carbostyryl derivatives, 0.5 g of an organic dye represented by a formula below is dissolved in 40 g of octafluoropentanol, and a resultant solution is treated by ultrasonic dispersion at 40° C. for 30 minutes, filtered through a filter of 0.2 μm, spread by spin coating at a rotational speed of 1300 rpm, and dried in an oven at 80° C. for 30 minutes.

(Chemical Formula 1)

Incidentally, as the organic dye contained in the first or second recording layer 103 or 108, for example, a compound represented by a formula below can be used. Moreover, for the first or second recording layer 103 or 108, other recording-layer material, e.g. a phase change-type recording material, a magneto-optical material, or the like, can also be used.

(Chemical Formula 2)

The first and second reflective layers 104 and 109 are provided on the first and second recording layers 103 and 108 by sputtering, respectively. The first and second cover layers 105 and 110 are formed to have thicknesses of 0.1 mm in the following manner: for example, a precursor of ultraviolet curing resin is applied on each of the first and second reflective layers 104 and 109 by spin coating, and hardened by ultraviolet irradiation. For the adhesive layer 111, delayed-action ultraviolet curing adhesive is used.

Next, a method of recording information on the optical recording medium 100 will be described. In the method of recording information on the optical recording medium 100, information is recorded by applying pulses of laser light 112 to the first or second recording layer 103 or 108. Specifically, a recording mark having a length of nT (n is an integer equal to or larger than 2, and T is one channel clock) is formed by applying (n−1) or (n−2) recording pulses (one recording pulse when n is 2) to the first or second recording layer 103 or 108. Such laser light pulse application is called (n−1) strategy or (n−2) strategy, and known as a method of avoiding formation of a recording mark having a length larger than the pulse width of the applied laser light due to an effect of heat accumulation on an optical disk when information is recorded on a write-once optical recording medium containing an organic dye. Table 1 shows examples of multi-pulse trains used in pulse application for formation of recording marks having lengths of 2T to 8T.

TABLE 1

|    | TSFP | Ttop | TEFP | TSMP | TEMP | Tmp  | TSLP | TELP | Tlp  |
|----|------|------|------|------|------|------|------|------|------|
| 8T | 1.0T | 0.8T | 1.8T | 0T   | 0.8T | 0.8T | 0T   | 0.8T | 0.8T |
| 7T | 1.0T | 0.8T | 1.8T | 0T   | 0.8T | 0.8T | 0T   | 0.8T | 0.8T |
| 6T | 1.0T | 0.8T | 1.8T | 0T   | 0.8T | 0.8T | 0T   | 0.8T | 0.8T |
| 5T | 1.0T | 0.8T | 1.8T | 0T   | 0.8T | 0.8T | 0T   | 0.8T | 0.8T |
| 4T | 1.0T | 0.8T | 1.8T | 0T   | 0.8T | 0.8T | 0T   | 0.8T | 0.8T |
| 3T | 1.0T | 0.8T | 1.8T | —    | —    | —    | 0T   | 0.8T | 0.8T |
| 2T | 0.4T | 1.4T | 1.8T | —    | —    | —    | —    | —    | —    |

Figure 2:
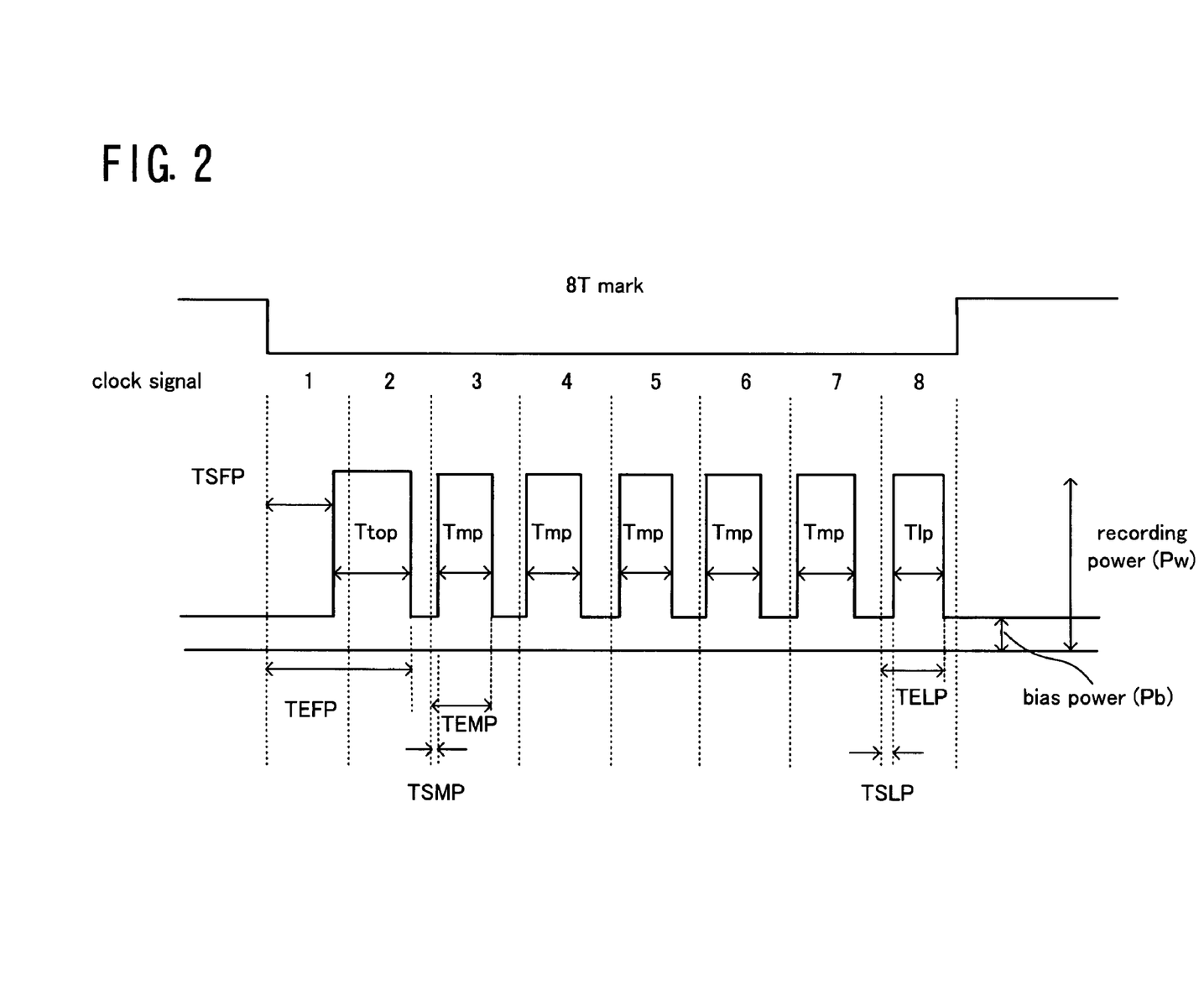
FIG. 2 is a view for explaining recording control pulses used in pulse application for formation of a recording mark having a length of 8T.

FIG. 2 is a view for explaining recording control pulses used in pulse application for formation of a recording mark having a length of 8T. For the recording control pulses shown in FIG. 2, recording power (Pw) is variable, bias power (Pb) is set to 0.2 mW, and a single pattern is used as a recording pattern. As shown in FIG. 2, the recording control pulses are divided into three parts. The first pulse is referred to as a front pulse (FRP), the recording power pulses which follow the FRP and which end with the pulse one pulse before an end pulse are referred to as multiple pulses (MLP), and the last pulse is referred to as an end pulse (ENP). Respective pulse widths thereof are referred to as TTop, Tmp, and Tlp. Further, respective delays between the pulses and reference clocks are referred to as TSFP, TSMP, and TSLP.

Conditions for recording information on the optical recording medium 100 is as follows: there are four kinds of recording speed (linear velocity) of the optical recording medium 100, i.e. 4 m/s, 6 m/s, 9 m/s, and 12 m/s; and one channel clock T is set to 22.5 ns (4 m/s), 15 ns (6 m/s), 10 ns (9 m/s), and 7.5 ns (12 m/s) for the respective recording speeds (linear velocities). In a semiconductor laser used, the wavelength is 405 nm, and the N/A is 0.65. Further, the laser spot diameter is 405/0.65=623 nm.

Next, the calibration of recording power (Pw) of the laser light for predetermined signal lengths of recording marks will be described.

In the present embodiment, when a signal is recorded on the optical recording medium having the recording layers, the following calibration is performed before an actual signal is recorded: test writing is performed in advance, then the test writing part is played back, and an optimum recording power for recording the actual signal is obtained based on a signal quality of the played back signal. For example, in a case of a CD-R, a test writing area called a power calibration area (PCA) is provided at an innermost radius of the optical recording medium. Further, calibration operation is called optimum power control (OPC). In order to perform the OPC, in case of a CD-R drive, first, the power of the laser light is changed in several steps or in a continuous manner, thus writing a test signal (eight-to-fourteen modulation (EFM)) to the PCA provided in the optical recording medium. Next, the written part in the PCA is played back, and a position of optimum write performance is determined from the signal quality of a played back RF signal. Then, the laser power when the signal at the above-described position has been recorded is regarded as an optimum recording power. The signal quality of the RF signal is checked by detecting the asymmetry of the RF signal.

Figure 5A:
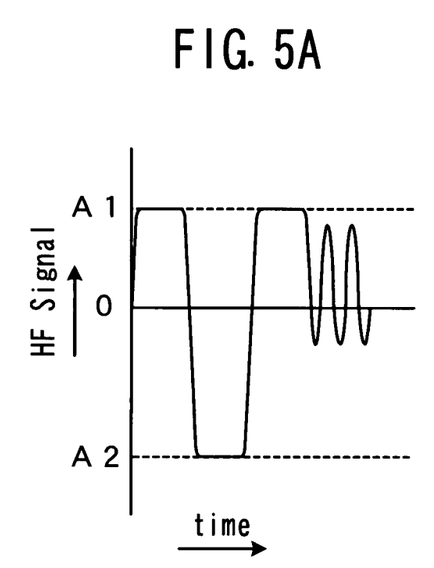
FIGS. 5A to 5C are views for explaining asymmetry.
Figure 5B:
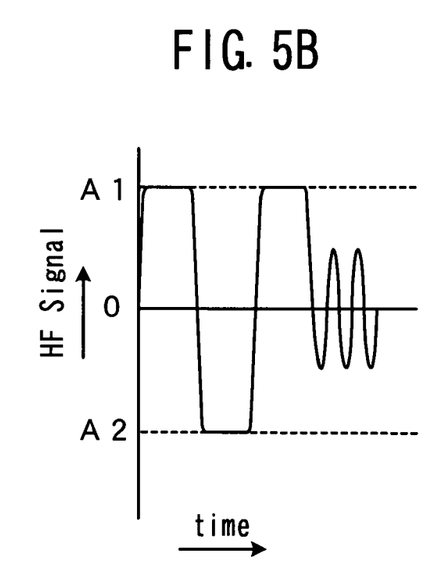
Figure 5C:
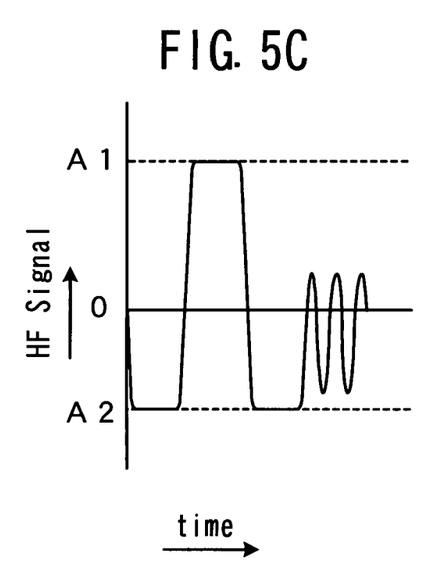

FIGS. 5A to 5C are views for explaining asymmetry. FIG. 5A shows a case where recording power is short, FIG. 5B shows a case where recording power is appropriate, and FIG. 5C shows a case where recording power is excessive. Horizontal axes of FIGS. 5A to 5C represent time (t), and vertical axes thereof represent high-frequency signals (readout signals, HF signals) Symbols A1 denote levels of upper envelopes, and symbols A2 denote levels of lower envelopes. A readout signal is detected as a signal called a high-frequency signal (HF signal).

In order to detect asymmetry, a top peak which reaches the level A1 of the upper envelope and a bottom peak which reaches the level A2 of the lower envelope are detected for each recording power using a predetermined detection circuit (not shown), based on an RF signal obtained by applying the laser light for reproduction to the optical recording medium. Then, using a predetermined calculation circuit (not shown), a value of asymmetry ($\beta$) defined by the equation below is calculated for each recording power.

$$\beta = (A1+A2)/(A1-A2)$$

As shown in FIG. 5A, when recording power is short, both the level A1 of the upper envelope and the level A2 of the lower envelope shift downward. On the other hand, as shown in FIG. 5C, when recording power is excessive, both the level A1 of the upper envelope and the level A2 of the lower envelope shift upward. As described above, a value of asymmetry ($\beta$) is defined as a quantity obtained by normalizing a shift amount by a signal amplitude. Accordingly, if recording power is appropriate, the value of asymmetry ($\beta$) becomes approximately zero ($\beta \approx 0$). The recording power in this case is determined to be an optimum recording power. Consequently, if actual recording is performed in a data recording area using this optimum recording power, recording and reproduction can be performed in a best state.

Calibration is performed by playing back recording marks which have predetermined signal lengths and which have been recorded on the optical recording medium 100 using the recording control pulses for pulse application shown in Table 1 and by finding a relationship between the asymmetry ($\beta$) of a readout signal obtained from each recording mark with respect to an 8T signal and the recording power for recording the recording mark. The readout signal was measured using a disk characteristics measuring machine (DDU-1000, manufactured by Pulstec Industrial Co., Ltd.). Measurement conditions were as follows: the optical recording medium 100 was rotated in such a manner that the linear velocity would become 6 m/s, the semiconductor laser light having a wavelength of 405 nm was focused using an objective lens having a numerical aperture of 0.65, and reproduction was performed with a read power of 0.2 mW. Arbitrary waveform data was inputted from a personal computer to a multi-signal generator, whereby an objective signal was outputted from the multi-signal generator to the DDU-1000, thus recording the readout signal.

Incidentally, for noise in an unrecorded state, a noise level of a readout signal at a frequency of 12 MHz was measured using a spectrum analyzer. Here, a resolution bandwidth (RBW) was set to 30 kHz, and a video bandwidth (VBW) was set to 100 Hz. As a result, a measured value of the noise level was −75.0 dBm.

Figure 3A:
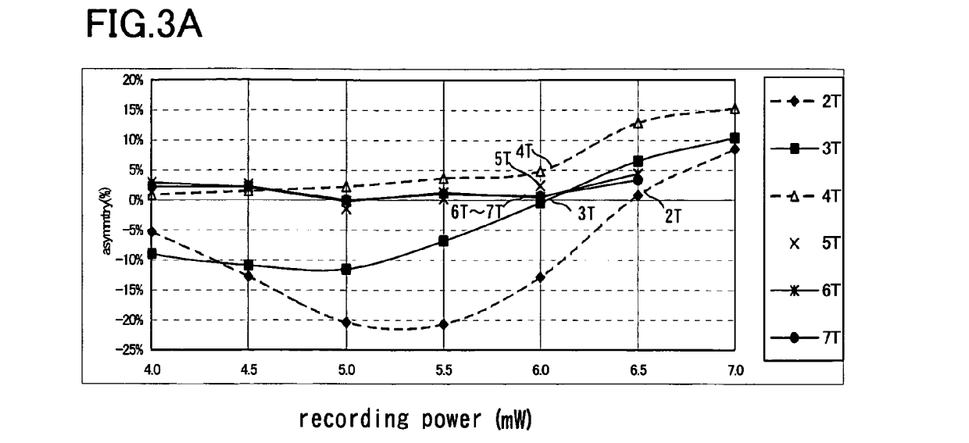
FIG. 3A is a graph in which the asymmetries of recording mark signals having respective signal lengths with respect to an 8T signal are plotted against recording power.
Figure 3B:
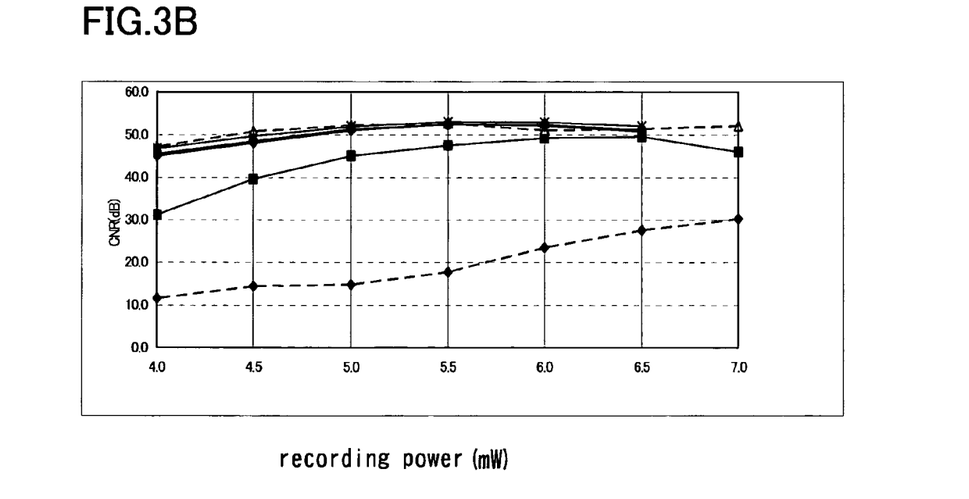
FIG. 3B is a graph in which C/N ratios of the recording mark signals having respective signal lengths are plotted against recording power.

FIGS. 3A and 3B are graphs for explaining a result of calibrating Pw (recording power) of the laser light for predetermined signal lengths of recording marks at a recording speed (linear velocity) of 6.0 m/s. FIG. 3A is a graph in which the asymmetries ($\beta$) of the recording mark signals having respective signal lengths with respect to an 8T signal are plotted against recording power. FIG. 3B is a graph in which C/N ratios of the recording mark signals having respective signal lengths are plotted against recording power.

According to FIGS. 3A and 3B, for 5T to 8T signals having signal lengths larger than ½ of the spot diameter of the laser light, the C/N ratios have peaks within a range in which recording power is 5.0 mW to 5.5 mW, and the asymmetries (β) with respect to the 8T signal approximately coincide within 0%+/−5% for all recording powers. Next, for a 4T signal having a signal length equal to ⅔ of the spot diameter of the laser light, the C/N ratio has a peak in a range in which recording power is 5.0 mW to 5.5 mW, and the asymmetries (β) with respect to the 8T signal approximately coincide within 0%+5% over a range in which recording power is 4.0 mW to 6.0 mW. The asymmetry (β) becomes 10% or more at high power in which recording power is 6.5 mW or more.

On the other hand, for a 3T signal having a signal length equal to or less than approximately ½ of the spot diameter of the laser light, the C/N ratio becomes maximum at a recording power of 6.0 mW, and the asymmetry (β) with respect to the 8T signal greatly changes to drop to −5% or lower in a range in which recording power is 5 mW or less. The asymmetry (β) becomes 0% at a recording power of 6.0 mW, and greatly changes to rise to a positive level in a range in which recording power is 6.0 mW or more. Furthermore, for a 2T signal having a signal length equal to approximately ⅓ of the spot diameter of the laser light, the C/N ratio is maximum in a range in which recording power is 7.0 mW or more, and the asymmetry (β) with respect to the 8T signal becomes 0% in a range in which recording power is 6.5 mW or more, unlike the 3T signal.

From the result shown in FIGS. 3A and 3B, it can be seen that for the 4T to 8T signals having signal lengths larger than ½ of the spot diameter of the laser light, the asymmetries (β) of all signals to be recorded can be aligned with 0% with the high C/N ratios maintained. In contrast, for the 2T and 3T signals having signal lengths equal to or less than ½ of the spot diameter of the laser light, it can be seen that the recording power at which the asymmetry (β) with respect to the 8T signal becomes 0% exhibits behavior different from those for the other signals, i.e. the 4T to 8T signals. This shows that in order to appropriately record the 2T and 3T signals and the other signals, i.e. the 4T to 8T signals, recording powers for recording the 2T and 3T signals need to be individually complemented for the respective signals based on the result of calibrating the recording power of the laser light for the predetermined signal lengths of recording marks.

Accordingly, in a recording of the optical recording medium in which recording marks having signal lengths of nT are to be formed, the asymmetries (β) of signals to be recorded can be made to be equal to each other by performing the calibration of top power of pulse application for each recording mark and by individually complementing recording powers for at least the shortest mark having a size smaller than ½ of the spot diameter of the laser light and the second shortest mark. As a result, all the recording marks having the signal lengths of nT can be appropriately recorded.

Next, similar verification was performed by changing recording speed (linear velocity), thus measuring optimum recording powers for the 2T and 3T signals at each recording speed (linear velocity). The result is shown in Table 2.

TABLE 2

| | Recording Linear Velocity (m/s) | | | | | | | |
|---|---|---|---|---|---|---|---|---|
| | 4.0 | | 6.0 | | 9.0 | | 12.0 | |
| | Signal Length | | | | | | | |
| | 2T | 3T | 2T | 3T | 2T | 3T | 2T | 3T |
| Optimum Recording Power (mW) | 5.3 | 4.9 | 6.5 | 6.0 | 8.0 | 7.3 | 9.3 | 8.3 |

Table 2 shows, for each recording speed (linear velocity), optimum recording powers at which the asymmetries (β) of the 2T and 3T signals become approximately 0%. From the result of Table 2, it can be seen that ratios between the optimum recording powers for the 2T signal and those for the 3T signal at the respective recording speeds (linear velocities) are approximately equal to each other. Accordingly, it can be seen that when a mark (2T signal or 3T signal) having a signal length smaller than ½ of the spot diameter of the laser light is recorded, recording power can be complemented using a numerical value roughly calculated from a predetermined calculating formula based on the recording power at a reference recording speed (linear velocity).

Accordingly, it can be seen that in order to appropriately record all of the 2T to 8T signals at each recording speed (linear velocity), the respective recording powers for recording the 2T and 3T signals need to be respectively complemented based on the result of calibrating the recording power of the laser light for recording marks having predetermined signal lengths. Further, it can be seen that the recording method of the present embodiment is also effective under various conditions in which recording linear speeds (linear velocities) are different.

Moreover, among specific methods for the above, as described above, a method in which the recording powers for recording the 2T and 3T signals are complemented by performing calibration at a plurality of recording speeds (linear velocities), and a method in which a numerical value roughly calculated from a predetermined calculating formula based on a recording power at a reference recording speed (linear velocity) is used for the complementing of recording power, are effective.

As described above, when optical information having a recording mark length smaller than the spot diameter of laser light is recorded on an optical recording medium at high density, performing the calibration for the complementing of recording power every time information is recorded is ideal. This is effective if applied laser power changes depending on accuracy tolerance of a pickup mounted in a drive, environmental temperature, and the like, or if unified conditions are difficult to maintain because of fluctuation in quality of manufactured media.

Incidentally, the following is an effective method as means for shortening a time required for calibration: information concerning the complementing of recording powers for respective mark lengths for which the information can be predicted to a certain degree from physical properties of the organic dye constituting the recording layers, the shapes of guide grooves formed in the substrates, and the like, is previously recorded in a predetermined area of the information recording medium before a user uses the information recording medium.

Moreover, it is also possible to record all pieces of information concerning the complementing of recording power, which information has been obtained from calibration performed at a plurality of recording speeds (linear velocities). This allows a time required for calibration to be further shortened.

In DVD-Rs and the like, information on recording powers for various medium makers is generally stored on memory of a drive. Every time data is to be written, medium information is read, a recording condition according to the medium information is set as an initial laser power, and optimum power control (OPC) is performed using a test area. Then, the data is written at a recording power determined by calibration.

On the other hand, in the information recording method to which the present embodiment is applied, calibration for recording marks (2T and 3T) having signal lengths equal to or less than ½ of the spot diameter of the laser light is further performed, and recording powers for recording the 2T and 3T signals are complemented, whereby the asymmetries (β) of the 2T and 3T marks can be set to approximately 0%.

Methods of manufacturing such an information recording medium in which information is to be recorded in a recording layer by laser light pulse application and in which data concerning the complementing of recording powers for recording marks having signal lengths equal to or less than ½ of the spot diameter of the laser light is previously recorded in a predetermined area, include the following two methods: the first method is to embed the above-described data in a cutting step of a stamper when a substrate of an information recording medium is manufactured; and the second method is to record the above-described data in the recording layer by an appropriate method after an information recording medium having a recording layer has been prepared.

Figure 4:
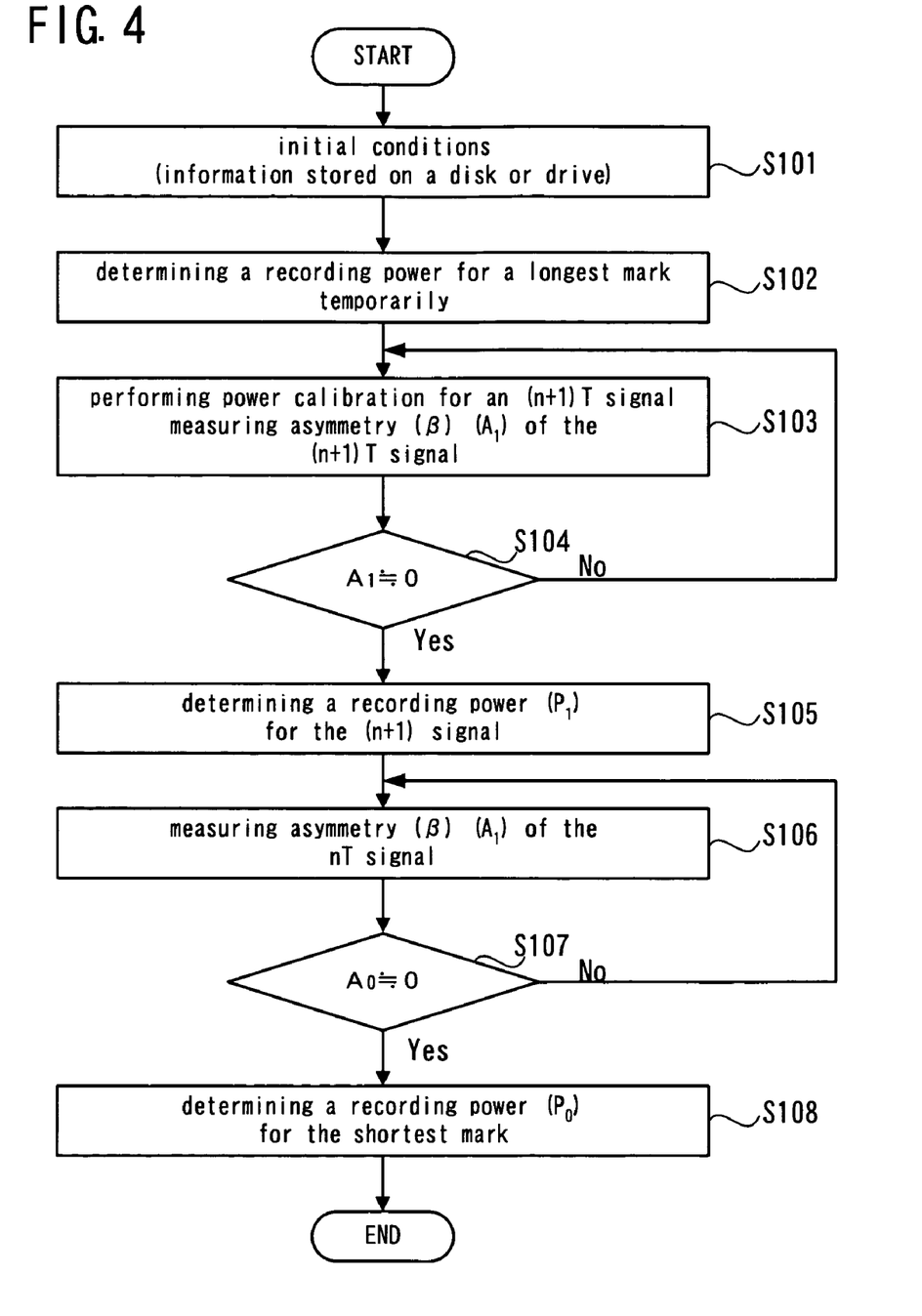
FIG. 4 is a flowchart showing a flow of a procedure for determining recording power.

FIG. 4 is a flowchart showing a flow of a procedure for determining recording powers by the information recording method to which the present embodiment is applied. First, initial conditions (information stored on a disk or a drive) are read (step 101), and then a recording power for a longest mark is temporarily determined (step 102). Next, power calibration for an (n+1)T signal is performed. First, asymmetry (β) ($A_1$) of the (n+1)T signal is measured (step 103), and the measurement is repeated until the asymmetry (β) ($A_1$) of the (n+1)T signal becomes approximately zero ($A_1 \approx 0$) (step 104), thus determining a recording power ($P_1$) for the (n+1)T signal (step 105). Subsequently, power calibration for a shortest mark (nT) is performed. First, asymmetry (β) ($A_0$) of the nT signal is measured (step 106), and the measurement is repeated until the asymmetry (β) ($A_0$) of the nT signal becomes approximately zero ($A_0 \approx 0$) (step 107), thus determining a recording power ($P_0$) for the shortest mark (nT) (step 108).

Incidentally, it is important that after the recording powers for the recording marks having the respective signal lengths have been determined, when data is actually written, recording power is optimized by correcting the recording power while a written state is being detected. This makes it possible to stably form recording marks. As a method of detecting the written state, it is effective to correct recording power according to the written state by detecting feedback light of recording light with so-called running OPC. Also in this case, if conditions for the complementing of recording power for the 2T and 3T signals are set in advance, the asymmetries (β) of the 2T and 3T signals can be always optimally made to be approximately 0% even in the middle of writing data.

Incidentally, in the present embodiment, intervals between recording pulses have been adjusted so that the recording pulses are equally spaced. However, even when the intervals between recording pulses are different from each other, a favorable result can be obtained. Further, though laser light having a wavelength of 405 nm has been used in the present embodiment, a similar result can also be obtained if a laser having a longer wavelength, e.g. approximately 650 nm, approximately 780 nm, or approximately 830 nm, is used. Moreover, though an objective lens having a numerical aperture of 0.65 has been used in the present embodiment, a similar effect can also be obtained if one having a numerical aperture from 0.45 to 0.7 is used. If a combination of two or more lenses which has a numerical aperture of 0.7 or more is used, a similar result can also be obtained. A combination of a lens of NA=0.85 and a laser having a wavelength of 405 nm allows high-speed and high-density recording. Furthermore, a similar effect can also be obtained in near-field recording in which evanescent light is used, by setting an effective NA to one or more in combination with a solid immersion lens (SIL) or the like.

To give an example of utilizing the present invention, for example, the present invention is effective when recording at a high density of 1.5 biT/m or more is performed. Further, the present invention is particularly effective when random mark length modulation recording of 1-7 modulation in which a shortest mark length is defined by 0.20λ/NA (µm) to 0.5×/NA (µm) (NA (numerical aperture)=0.65 to 0.85, λ (recording and reproducing wavelength)=0.40 to 0.70 µm) is performed.

What is claimed is:

1. A method of recording information on an information recording medium having a recording layer, the method comprising:
   a first power calibration step of determining a first recording power for recording a first recording mark having a predetermined recording mark length in the recording layer using laser light, the first power calibration step comprising:
      recording a first test mark in a test writing area provided in the recording layer;
      playing back the first test mark;
      detecting a first asymmetry of an RF signal reproduced from the recorded first test mark; and
      determining the first recording power based on the first asymmetry; and
   a second power calibration step of determining a second recording power, based on the first recording power determined in the first power calibration step, the second recording power for recording a second recording mark having a recording mark length equal to or less than ½ of a spot diameter of the laser light in the recording layer using the laser light, the second power calibration step comprising:
      recording a second test mark in a test writing area provided in the recording layer;
      playing back the second test mark;
      detecting a second asymmetry of an RF signal reproduced from the recorded second test mark; and
      determining the second recording power by adjusting the first recording power determined in the first power calibration step so that the second asymmetry is set to approximately zero.

2. The method according to claim 1, wherein the second power calibration step has a process of determining a second recording power, for each recording speed when the second recording mark is recorded on the information recording medium, the second recording power for recording the second recording mark having the recording mark length equal to or less than ½ of the spot diameter of the laser light.

3. The method according to claim 1, wherein the second power calibration step has a process of calculating a second recording power at a predetermined recording speed based on the second recording power at which the second recording mark having the recording mark length equal to or less than ½ of the spot diameter of the laser light has been recorded at a reference recording speed.

4. The method according to claim 1, wherein the second power calibration step performs determining the second recording power for recording, in the recording layer, using the laser light, the second recording mark in which the recording mark length of information is ⅓ or less of the spot diameter of the laser light.

5. The method according to claim 1, wherein the laser light provides pulse application in which pulses are intermittently applied to the recording layer at predetermined intervals.

6. The method according to claim 1, wherein the laser light forms a recording mark having a length of nT (n is an integer equal to or larger than 2, and T is one channel clock) by applying one of (n−1) and (n−2) (one when n is two) recording pulses to the recording layer.

7. The method according to claim 1, wherein the recording layer contains organic dyes.

8. A method of determining a recording power for recording information on an information recording medium having a recording layer, the method comprising:

a first power calibration step of determining a recording power for recording a first recording mark having a predetermined recording mark length in the recording layer using laser light, the first power calibration step comprising:

recording a first test mark in a test writing area provided in the recording layer;

playing back the first test mark:

detecting a first asymmetry of an RF signal reproduced from the recorded first test mark; and determining the first recording power based on the first asymmetry: and a second power calibration step of determining a second recording power, based on the first recording power determined in the first power calibration step, the second recording power for recording a second recording mark having a recording mark length equal to or less than ½ of a spot diameter of the laser light in the recording layer using the laser light, the second power calibration step comprising:

recording a second test mark in a test writing area provided in the recording layer;

playing back the second test mark;

detecting a second asymmetry of an RE signal reproduced from the recorded second test mark; and determining the second recording power by adjusting the first recording power determined in the first power calibration step so that the second asymmetry is set to approximately zero.

\* \* \* \* \*